United States Patent Office 2,987,539
Patented June 6, 1961

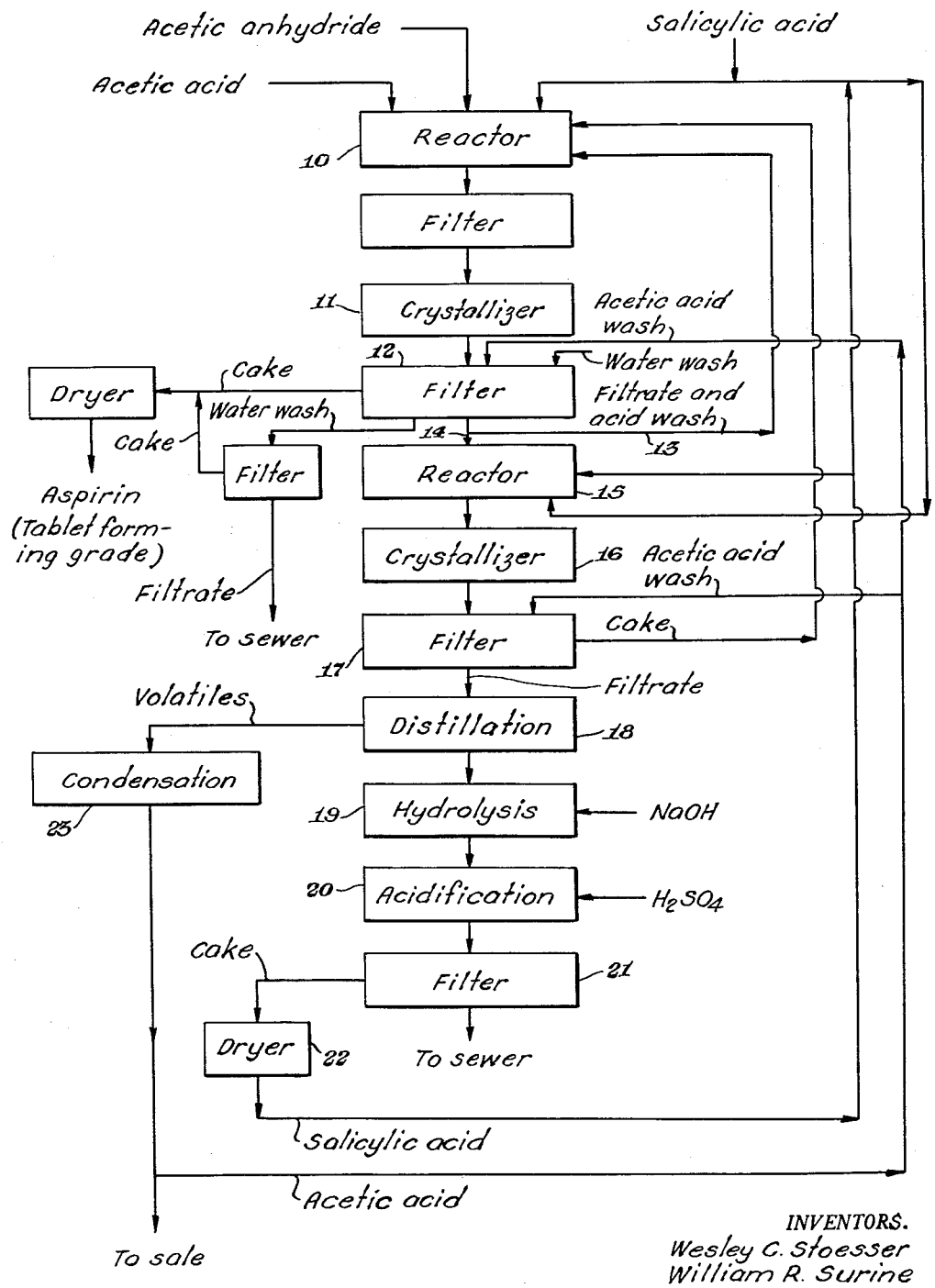

2,987,539
PROCESS FOR THE PRODUCTION OF ASPIRIN
Wesley C. Stoesser and William R. Surine, Midland, Mich., assignors to The Dow Chemical Company, Midland, Mich., a corporation of Delaware
Filed Oct. 10, 1957, Ser. No. 689,441
4 Claims. (Cl. 260—480)

The present invention relates to a process for the production of aspirin and more particularly concerns an improved process whereby increased yields of tablet-forming aspirin crystals are obtained.

The production of aspirin is a relatively old art reputedly originating in Germany. The processes for its production have undergone little change in the past years. Basically the process as employed today is the result of the application of semi-continuous procedures to the old batch process steps. The purity of the crystals from the present day process is high but the form of the crystals is not that of a good tablet-forming grade in the initial reaction. Therefore recrystallizations from different solvent systems are necessary to obtain crystals which can be satisfactorily employed in the tablet-forming art. The present day processes also present major problems in the recovery of unreacted chemicals, solvents and by products whose recovery normally reduces the expenses of the process.

It is, therefore, an object of the present invention to provide a process whereby a tablet-forming grade of aspirin crystals is obtained in the initial reaction. It is another object of the present invention to provide a process whereby the heretofore-lost values are recovered and may be returned to the process. It is a further object of the present invention to provide a process for the increased production of aspirin. These and other objects will become apparent to those skilled in the art from the following description and claims.

In the drawings, FIGURE 1 represents a schematic flow diagram embodying the concepts of the present invention.

Referring with more particularity to the accompanying drawing, a charge of acetic acid, salicylic acid and acetic anhydride is fed into reactor 10. The reactor 10 and its contents are slowly raised to about 85° C. and subsequently held at 85° C. until the reaction is substantially complete. Upon completion of the reaction, the reaction mixture is cooled with stirring to crystallize an aspirin product. This crystallization may take place in the reaction vessel 10 or in a separate crystallizer 11. In either event the aspirin crystals are separated from an acetic anhydride-rich mother liquor by filtration on filter 12 and the so separated crystals washed first with glacial acetic acid and then with water. The crystals obtained are of a crystalline structure such as to be easily formed into tablets. The acetic anhydride-rich mother liquor and the acetic acid wash liquors are combined and divided, 30 to 70%, 13, being returned to reactor 10. The remainder of the filtrate 14, 70 to 30%, is fed to a second reactor 15. Salicylic acid is charged into the second reactor 15 and the reactor 15 and contents are slowly heated to 85° C. and subsequently held there until completion of the reaction. The reaction mixture is thereafter crystallized in, for example, a crystallizer 16. The crystallization takes place with cooling and stirring and the crystals which form are separated from the mother liquor by filtration on filter 17. The crystals are carefully washed with glacial acetic acid and the acetic acid wash combined with the second mother liquor. The resulting crystals are not as suitable for tableting and are recycled to reactor 10. The 2nd mother liquor and the acetic acid wash are distilled under reduced pressure to remove the volatile constituents and to obtain a residue convertable to salicylic acid. The residue is hydrolyzed 19 with sodium hydroxide, thereafter cooled and acidified 20 with sulfuric acid. The resultant mixture is again cooled, filtered 21, washed with water and dried 22 to obtain a salicylic acid product which is returned to reactor 15. The volatile constituents from the distillation step are condensed 23 and acetic acid recovered therefrom. The so recovered acetic acid is of a usable grade and may be used in the process, for example, as the acetic acid for washing the cake in filter 12.

The following example is illustrative of the present invention but is not to be construed as limiting:

*Example*

Step 1.—552 grams of salicyclic acid, USP, 572 grams of acetic anhydride and 240 grams of glacial acetic acid were charged to a reactor fitted with a stirrer and the reactor and contents heated slowly to 85° C. over a one hour period. The reaction mixture and reactor were thereafter held at 85° C. for 1.5 hours. Upon completion of the reaction, the reaction mixture was cooled with stirring and seeded with aspirin crystals to initiate crystallization. Crystallization began at about 77° C. Cooling and stirring were continued until the temperature of the reaction mass reached 15° C. The crystals were then filtered off and washed with 120 grams of glacial acetic acid. The washings were added to the filtrate. The crystals were washed with water to remove the acetic acid. There was obtained, upon drying, 570.4 grams of aspirin crystals which were suitable for forming non-crumbling, quickly dissolvable aspirin tablet. The water wash was filtered to recover aspirin which upon standing had precipitated in the wash water. There was obtained from this operation an additional 5.2 grams of aspirin crystals which were added to the previous crystal crop. The total yield of aspirin crystals, 575.6 grams, based on the salicylic acid employed, was 79.2 percent.

Step 2.—424 grams (53 percent) of the filtrate and washings from the startup step 1, containing 76.0 grams acetic anhydride, 510 grams of acetic anhydride and 552 grams of salicyclic acid were charged to a reactor, heated slowly to 85° C. over a one hour period and held at 85° C. for 1.5 hours. The reaction mixture was crystallized and filtered as hereinbefore described in step 1 to obtain a filtrate and a crystalline product which was washed with glacial acetic acid and water and dried to obtain 624.3 grams of aspirin crystals which were suitable for tableting. The yield of suitable crystals was 87.2 percent based on salicylic acid employed in this step and 83.5 percent on the total salicylic acid employed in the two steps.

Step 3.—The remainder of the filtrate from step 1 (startup), 374 grams, containing 67.0 grams acetic anhydride, was mixed with 91 grams of salicylic acid which is the molar equivalent of the acetic anhydride present. The reaction mixture was heated slowly to 85° C. over a one hour period and held thereat for 1.5 hours. Upon completion of the reaction, the reaction mixture was cooled with stirring and seeded to initiate crystallization. Upon completion of the crystallization, the reaction mixture was filtered at 10° C. and washed with 30 grams of glacial acetic acid. The crystals, wet with acetic acid, 156.5 grams were long fluffy needles not suitable for making tablets and were transferred to step 4.

Step 4.—The crystals from step 3, 156.5 grams, 424 grams of the filtrate from Step 2, 450 grams of acetic anhydride and 461 grams of salicylic acid were treated in exactly the same manner as step 2, crystallized and filtered; the crystals were washed with acetic acid and water to obtain 635.1 grams of aspirin crystals suitable for tableting. The steps 3 and 4 were repeated four more times to obtain a total yield of 4396.1 grams of aspirin crystals suitable for tableting in overall yield of 88 percent based on the salicylic acid employed.

*Step 5.*—The filtrates from the repetitions of step 3, 1856.5 grams total, were distilled to a pot temperature of 154° C. under 35 millimeters of mercury pressure to obtain 1591 grams of distillate containing 3.5 percent acetic anhydride and 96.5 percent acetic acid, which later was partly returned to the process as acid washes, and a residue. This residue, 254.7 grams, was hydrolyzed by refluxing with sodium hydroxide, acidified with sulfuric acid, cooled, filtered, water washed, and dried, to obtain 238.5 grams of salicylic acid which was returned to the process.

The recovery of the usable values raises the yield of tablet forming grade of aspirin product, to 93 percent based on the salicylic acid employed in the process.

We claim:

1. In a method of producing aspirin by reacting together acetic acid, salicylic acid and acetic anhydride to produce crystalline aspirin, the improvement which comprises reacting the salicylic acid with an excess of acetic anhydride and acetic acid at a temperature of between about 70° and 100° C., crystallizing the aspirin so formed, separating the crystallized aspirin from the reaction mass, washing the so obtained crystallized aspirin with acetic acid then with water, reacting salicylic acid with a 30% to about 70% portion of the resulting filtrate and washings so as to produce an additional quantity of crystalline aspirin from the residual reactants of the said filtrate, separating the resulting crystallized aspirin from the reaction mass, washing the so separated crystallized aspirin with acetic acid and returning the balance of the first filtrate and the last mentioned crystallized aspirin to the first step in the process, recovering salicylic acid from the second filtrate and returning the so recovered salicylic acid to the process.

2. In a method for the production of aspirin the improvement which comprises the steps: (1) feeding to a first reactor a mixture of salicylic acid, an excess of acetic anhydride and acetic acid; (2) heating said reactor and reaction mixture slowly to a temperature of between about 70° and 100° C. and maintaining said reactor and reaction mixture thereat until the reaction is substantially complete; (3) crystallizing aspirin crystals from the reaction mixture; (4) separating the reaction mixture to obtain a crystalline aspirin product and a first mother liquor; (5) washing the product with glacial acetic acid then with water; (6) recovering the washed product; (7) combining the acetic acid wash with the said first mother liquor; (8) recycling, to the first step, from between about 30 to about 70 percent of the said first mother liquor; (9) mixing the remainder of the mother liquor with an amount of salicylic acid equivalent to the acetic anhydride in the said mother liquor, thus to form a second reaction mixture and heating said second reaction mixture slowly to a temperature of from 70° to about 100° C. and maintaining said reaction mixture thereat until the reaction is substantially complete; (10) crystallizing an aspirin product from the second reaction mixture; (11) separating the so produced crystallized aspirin from the mixture so as to obtain a crystalline aspirin cake and a second mother liquor; (12) washing the so obtained crystalline cake with acetic acid; (13) recycling said washed cake to said first step; (14) distilling the combined second mother liquor filtrate and washings to obtain a residue and volatiles; (15) condensing the volatiles to obtain acetic acid and acetic anhydride; (16) hydrolyzing the residue obtained with caustic; (17) acidifying the hydrolyzed liquor with mineral acid to recover therefrom salicylic acid, and; (18) recycling the so recovered salicylic acid to the process.

3. In a method for the production of aspirin the improvement which comprises the steps; (1) reacting a mixture of salicylic acid with an excess of acetic anhydride in the presence of acetic acid to obtain an aspirin product; (2) crystallizing said aspirin product from said reaction mixture; (3) separating said aspirin product to obtain an aspirin product as a crystalline solid and a first mother liquor; (4) washing said aspirin product with glacial acetic acid then with water; (5) recovering the washed aspirin product as a crystalline solid; (6) combining said acetic acid wash with said first mother liquor and recycling a portion of said acid-enriched mother liquor to step 1; (7) reacting the remainder of the mother liquor with salicylic acid to produce a second aspirin product; (8) crystallizing and separating said second aspirin product to obtain aspirin crystals and a second mother liquor; (9) washing said aspirin crystals with glacial acetic acid; (10) recycling said washed crystals to step 1, and (11) recovering from the second mother liquor salicylic acid and acetic acid.

4. In a method for the production of aspirin by the reaction of salicylic acid, acetic anhydride and acetic acid to obtain aspirin and an acetic anhydride-rich mother liquor; the improvement which comprises (1) recycling from between about 30 and about 70 percent of said mother liquor to a first reactor; (2) reacting the remainder of the said mother liquor with an equivalent amount of salicylic acid, crystallizing said reaction mixture, separating said crystallized reaction mixture to obtain crystalline aspirin and a second mother liquid, washing said crystalline aspirin with glacial acetic acid, combining said wash acetic acid with said second mother liquor, returning said acetic-washed crystals of aspirin to said first reactor and recovering salicylic acid and acetic acid from said second mother liquor and acetic acid wash.

References Cited in the file of this patent

UNITED STATES PATENTS 2,731,492    Kamlet  ---------------- Jan. 17, 1956

OTHER REFERENCES

Miralles: Chemical Abstracts, vol. 49, col. 2500.
Porter: Chem. Eng., vol. 55, No. 3, pp. 97–8 and 136–9 (1948).